United States Patent [19]

Corbett

[11] Patent Number: 4,703,216
[45] Date of Patent: Oct. 27, 1987

[54] OSCILLATING CRYSTAL TRANSDUCER SYSTEMS

[76] Inventor: James P. Corbett, 923, Palermo Dr., Santa Barbara, Calif. 93105

[21] Appl. No.: 834,383

[22] Filed: Feb. 28, 1986

Related U.S. Application Data

[63] Continuation-in-part of Ser. No. 775,353, Sep. 12, 1985.

[51] Int. Cl.$^4$ .............................................. H01L 41/08
[52] U.S. Cl. ...................................... 310/338; 73/778
[58] Field of Search ............... 310/338, 339, 328, 346, 310/366, 369; 73/774, 775, 778, 781, 760, 763, 700, 703, 754, 514, 517 AV, DIG. 4; 177/DIG. 11, 210 R, 211, 210 FP

[56] References Cited

U.S. PATENT DOCUMENTS

| | | | |
|---|---|---|---|
| 1,912,213 | 5/1933 | Nicolson | 73/774 |
| 2,137,852 | 11/1938 | Nicolson | 73/778 X |
| 3,274,828 | 9/1966 | Pulvari | 73/DIG. 4 |
| 3,891,870 | 6/1975 | Corbett | 310/338 |
| 3,903,733 | 9/1975 | Murayama et al. | 73/DIG. 4 |
| 4,020,448 | 4/1977 | Corbett | 310/338 X |
| 4,096,740 | 6/1978 | Sallee | 73/778 |
| 4,175,243 | 11/1979 | Corbett | 310/338 |
| 4,372,173 | 2/1983 | Eer Nisse et al. | 73/778 X |
| 4,439,705 | 3/1984 | Corbett | 310/338 |
| 4,485,323 | 11/1984 | Corbett | 310/338 |

Primary Examiner—Mark O. Budd

[57] ABSTRACT

A force and pressure transducer comprises a plate-like crystal. Two separate portions of the crystal are maintained in oscillation at different frequencies by a circuit. The crystal is firmly secured to a solid member in such a manner that deformation in the solid manner, caused by the force or fluid pressure to be measured, results in a secondary force being transmitted to the crystal. This compels the frequency of one of the two oscillating portions of the crystal to change substantially whereas the frequency of the other portion changes only minimally. The difference frequency between the two portions is a highly accurate measure of the force or fluid pressure to be measured.

In oscillating crystal transducers hitherto employing plate-like crystals wherein the force to be measured is transmitted along the surface direction, the maximum applicable force has been limited by the ability of the crystal to sustain larger forces.

The new development claimed herein permits large forces and fluid pressures to be measured.

17 Claims, 22 Drawing Figures

OSCILLATING CRYSTAL TRANSDUCER SYSTEMS

CROSS REFERENCE TO PREVIOUS APPLICATION

This application is a continuation-in-part of my copending U.S. application Ser. No. 775,353 filed Sept. 12th, 1985.

BACKGROUND OF THE INVENTION

This invention relates to oscillating force and pressure transducer systems of the type generally described in my U.S. Pat. Nos. 4,175,243 4,439,705 and 4,485,232 also upon the principles enunciated in my U.S. Pat. Nos. 3,891,870 4,020,448 4,067,241 and 4,126,801.

Transducers working on the foregoing principles have given excellent performance over certain force or pressure ranges but these ranges have been limited to a few tens of pounds or pounds per square inch because of the inability of the crystals to directly bear large forces.

According to the present invention oscillating quartz transducers capable of measuring much larger forces and pressures, which may be in the order of hundreds or thousands of pounds per square inch, is described. The new transducer contains a crystal which is similar in construction to that shown in my U.S. Pat. No. 4,485,232, FIG. 4. of which is reproduced again for reference in the present disclosure. This is a single plate-like oscillating crystal which sustains the force to be measured at its periphery by transmission of said force along the direction of the crystal surface in order to produce, in response to said force, a change of the resonant frequency of the crystal.

The force may originate from a fluid pressure to be measured, this pressure being applied to a diaphragm which forms part of the transducer enclosure.

The plate-like crystal of my U.S. Pat. No. 4,485,323 has on it two oscillating portions. As described in that Patent, the force to be measured was applied along the direction of the crystal surface and across one of the two oscillating portions by two seatings located on opposite sides of said oscillating portion. The edge of the crystal was arranged to be indented into the surface of each seating by a substantial overload force, as described in my U.S. Pat. No. 4,126,801, thus providing a short, but well-defined, length of support of the crystal edge on the seating. This permitted accurate measurement of the force, in the normal range of force measurement of the instrument, by bringing about a precise frequency change of the oscillating portion of the crystal across which the force was applied. Such a construction method, although excellent for smaller forces to be measured by the transducer, resulted in significant limitation in the amplitude of said forces because of the close proximity of the amplitude of the strain in the quartz to the strain failure amplitude of the quartz in the compressional mode.

SUMMARY OF THE INVENTION

The present invention comprises a crystal of the type heretofore described wherein the crystal is secured at its edges by glass or ceramic cement which is arranged to bond the crystal to a substantial metal or other member such that, deformation of this member by a large force which it is desired to measure, causes force of a lower magnitude to be applied across the force-sensitive oscillating portion of the crystal, said lower force being readily sustainable by the crystal. Thus a transducer is formed which is capable of measuring much larger forces than hitherto.

The substantial metal or other member may take the form of a steel bar or of a diaphragm which seals an enclosure containing the crystal. A seismic mass may also be secured to the substantial member to permit the unit to behave as an accelerometer.

DESCRIPTION OF THE PREFERRED EMBODIMENTS

Figure 1:
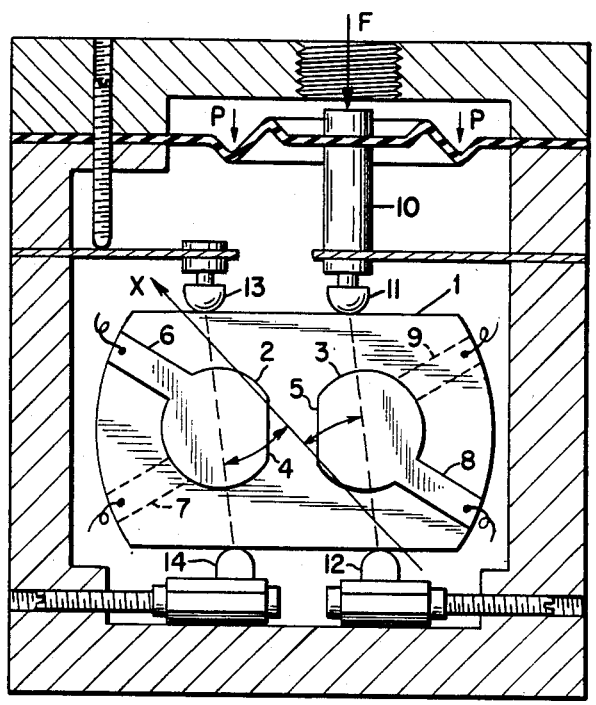
FIG. 1. shows prior art and is included to facilitate explanation.

Referring firstly to the prior art in FIG. 1. to facilitate explanation, an elongated plate-like crystal 1 has on its faces two pairs of electrodes 2 and 3, each pair being formed by one electrode on each side of the plate. All four electrodes are circular and generally of the same diameter but have chords 4 and 5 removed to increase spacing and prevent interaction between electrodes. Said electrodes are connected away to the crystal edges by tabs 6, 7, 8 and 9. Suitable oscillator circuit means, not shown, is used to keep the two crystal portions between each electrode pair in oscillation in the thickness shear mode at two slightly different frequencies. Force F applied by stem 10 and seating 11 increases the compression on crystal 1 by forcing it against seating 12. This causes the frequency of the oscillating portion of the crystal under electrode 3 to increase in a linear and accurate manner with increasing force.

The difference frequency between the oscillating portions of crystal 1 under electrodes 2 and 3 forms the transducer output and is employed so that frequency v.s. ambient temperature variation of the portion under electrode 3 is compensated by identical frequency v.s. temperature behaviour of the electrode under portion 2. Further, difference frequency variation sensitivity v.s. applied force is made to be independent of ambient temperature variation by selecting the angular relationship between the X-axis in the quartz and a line joining the seatings 11 and 12, as described in further detail in my U.S. Pat. No. 4,485,323.

Adjustment of the position of seating 14 may be employed to compensate for minor residual manufacturing inaccuracies of the ambient temperature v.s. difference frequency variation. This adjustment can also be achieved in an alternative manner by thermal compensation in the circuits which maintain oscillation.

A crystal of the form described above is used in the present invention which will now be described with reference to FIGS. 2 and 3.

These figures show crystal 21 bonded at its edges 22 and 23 to substantial member 26 by fused ceramic material 24 and 25. Said material may be glass. Such glass can be applied in powdered form. For example, a suitable material is Corning Glass Works Ferrite Sealing Glass Type 7567. The glass can also conveniently be applied in rod form which is round or rectangular in section. The glass has a coefficient of expansion which matches that of both the crystalline quartz, normally used in oscillator crystals and the substantial member 26 which may, for example, be of a selected stainless steel or other metal the coefficient of expansion of which matches the quartz. The bonding is achieved by raising the temperature of the low melting point sealing glass until it melts, this temperature being below the melting point of the crystalline quartz.

Steel member 26 which is bolted to reference surface 27 is designed to have substantial strength so that it will, for example, bear loads of several hundreds or thousands of pounds within its elastic limit.

Figure 3:
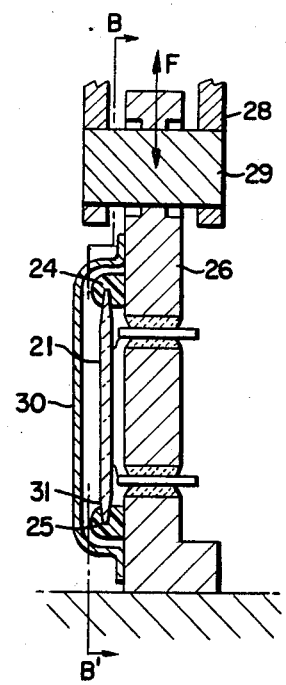

It will be noted in FIG. 3 that the inner face of crystal 21 does not touch substantial member 26. This is in order that the accoustical oscillation of the crystal at its electrodes is not damped or prevented from occurring. The small separation is achieved by inserting s temporary spacer between crystal 21 and member 26 during fabrication and withdrawing it when fabrication is completed.

The force to be measured by the instrument is applied by a yoke 28 consisting of a pin 29 which passes through a hole in member 26. Force F may be tensile or compressive and it is applied on a line normal to the crystal edge 22 passing through the center of one of the two oscillating portions of crystal 21.

The yoke is provided to dispose of unwanted torsional forces in member 23. Alternative provision could, however, be made for example by a flexing member.

Strain in member 23 in the direction of force F results in tension or compression in crystal 21 and suitable design ensures that fracture of crystal does not occur in either mode. The strain in the quartz is equal to that in the steel across the bonding points 24 and 25 thus the stress in the quartz $S_q$ can be shown to obey the following equation:

$$S_q = \frac{E_q}{E_s} \times S_s$$

where $S_s$ is the stress in the steel and $E_q$ and $E_s$ are respectively elastic modulii of the quartz and steel.

The stress in member 26 can thus be arranged to have a value well within its elastic limit and to apply a stress to the quartz which is well within the elastic limit of the quartz.

A thin metal cover 30 is provided over the crystal to ensure water vapor, or foreign matter does not affect crystal performance.

A transducer is therefore provided which has the ability to measure large forces. As will be shown, large fluid pressures and accelerations may also be measured.

Figure 2:
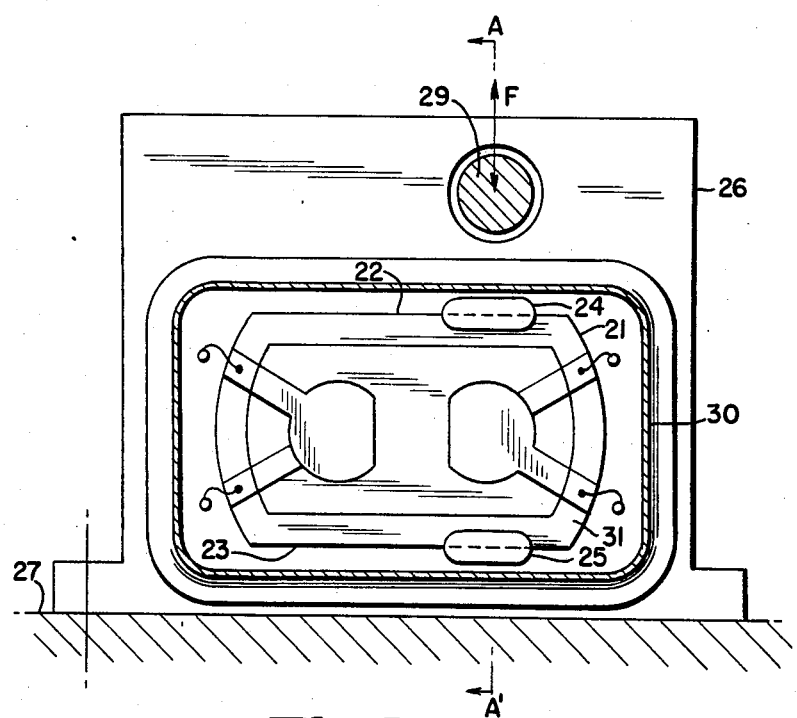
FIGS. 2 and 3 show a sectional side view and sectional elevation of a load cell incorporating the invention.
Figure 4:
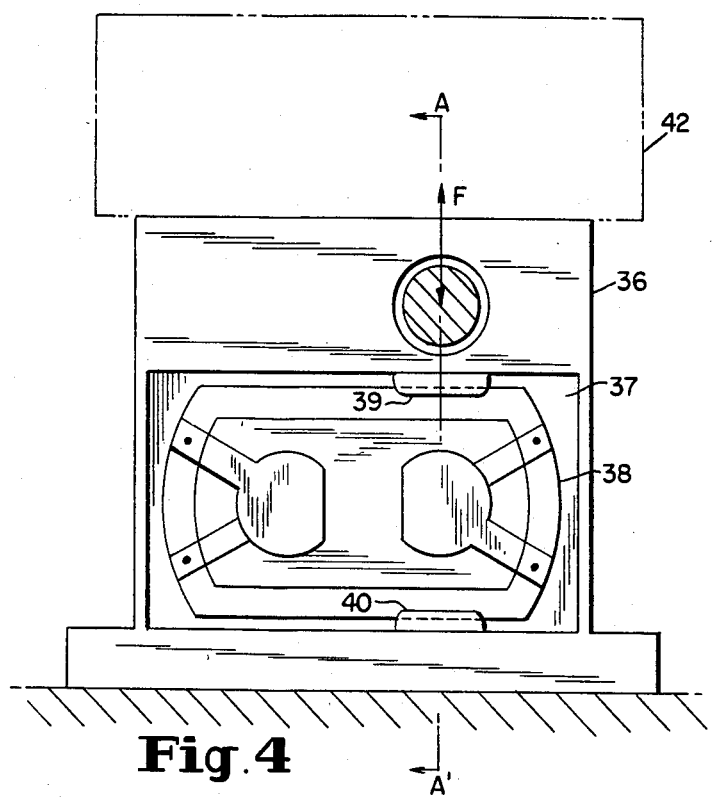
FIGS. 4 and 5 show a sectional side view and sectional elevation of a load cell with alternative crystal securing.
Figure 5:
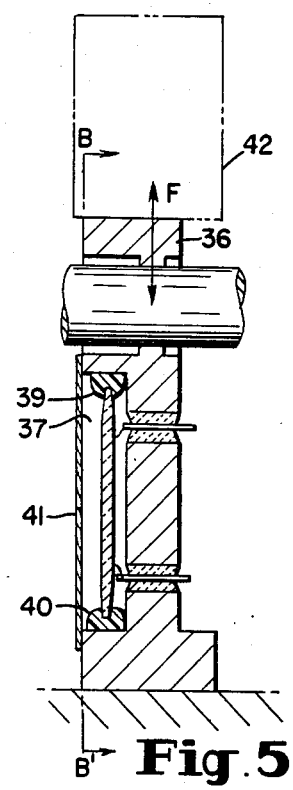

The transducer shown in FIGS. 4 and 5 is identical to that shown in FIGS. 2 and 3 except that a cavity 37 in substantial member 36 is now provided for crystal 38. This enhances the crystal securing by reducing the amount of ceramic bonding material 39 and 40 employed, also a simple thin metal sheet cover 41 can now be used.

The transducer shown in FIGS. 6 and 7 is again similar to the foregoing but in this case metal shoes 63 and 64 are provided. Edges 65 and 66 of the crystal sit in small slots 67 and 68 along the length of the shoes and are bonded in position using ceramic or the fused glass heretofore described. Shoes 63 and 64 are also bonded or welded to the substantial member 62. The necks between the two sections of each of the shoes 63 and 64 are designed to be sufficiently flexible to assure no undesirable torsion of the crystal and to allow uniform force distribution of force along the crystal edges 65 and 66.

Figure 6:
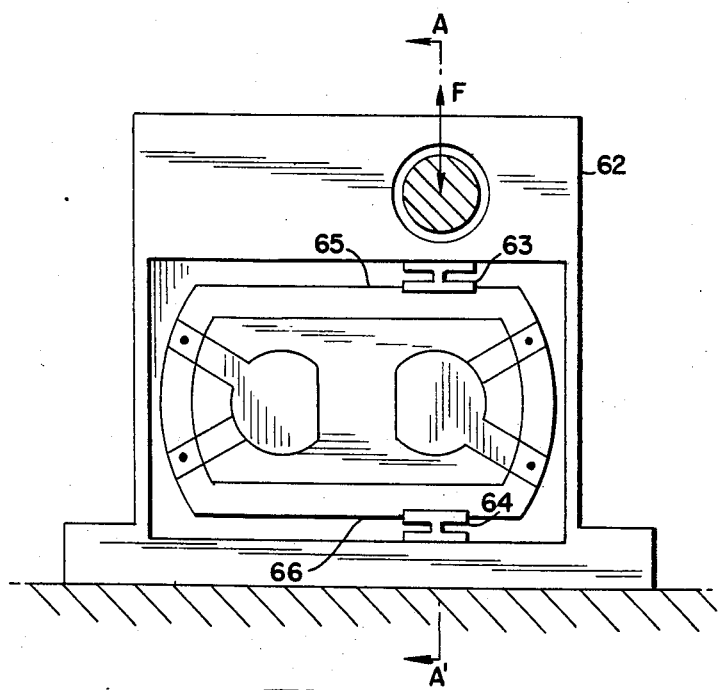
FIGS. 6 and 7 are similar to the foregoing figures but show seatings providing improved force distribution along the crystal edges.
Figure 7:
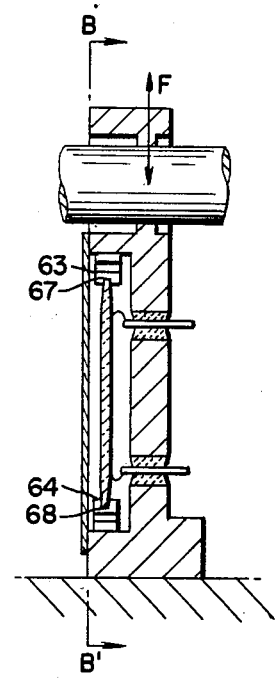
Figure 8:
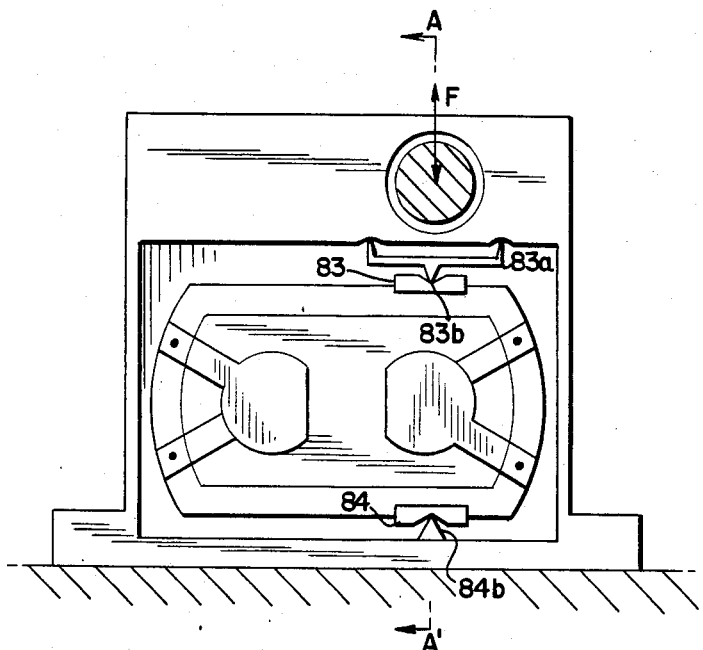
FIGS. 8 and 9 show seatings providing yet further improved force distribution along the crystal edge.
Figure 9:
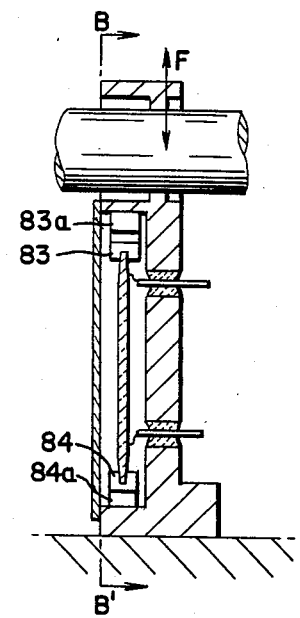

FIGS. 8 and 9 show seatings having advantages similar to those of the transducer shown in FIGS. 5 and 6 but with the added feature of simplicity of crystal installation. This is facilitated by stiff load spring member 83a which applies a preset force to shoe 83. The shoe is again bonded to the crystal edge as heretofore described. Hardened steel knife edge 83b applies a clamping force on shoe 83 and a similar assembly consisting of shoe 84 and knife edge 84b which has no load spring but supports the lower edge of the crystal.

Figures 10, 11:
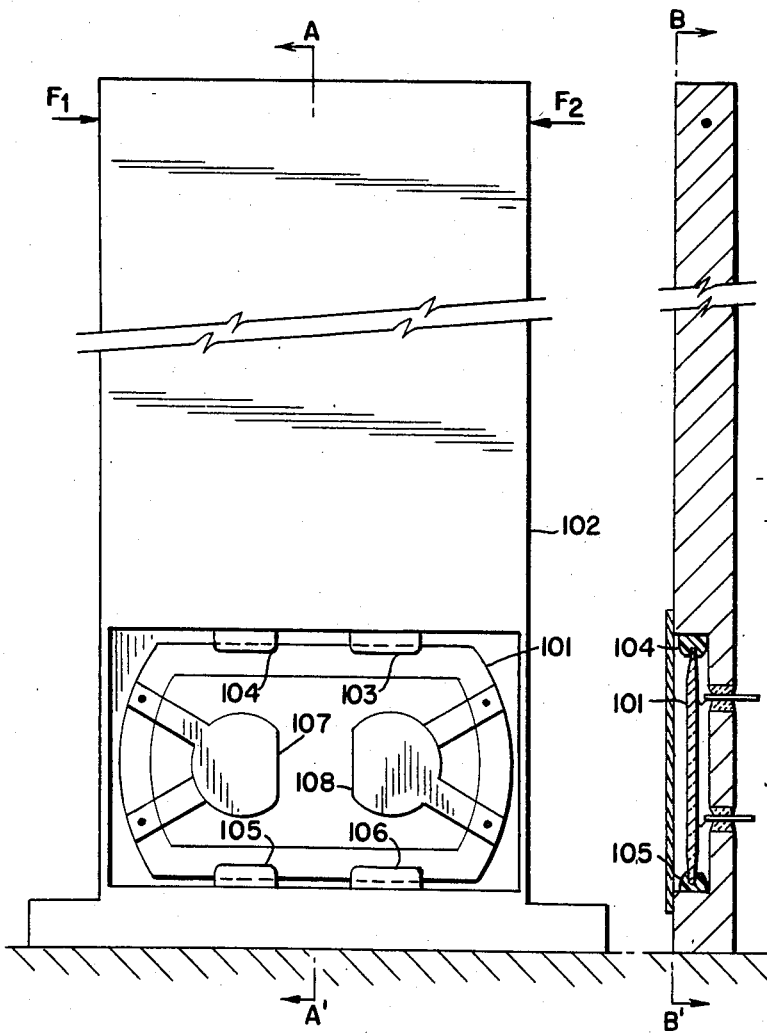
FIGS. 10 and 11 show a sectional side view and sectional elevation of a load cell arranged to measure the difference between two forces.

FIGS. 10 and 11 show a transducer arranged to measure the difference between two forces $F_1$ and $F_2$. The transducer is similar to the foregoing ones but has four bonding points 103, 104, 105, 106 between crystal 101 and substantial number 102. Because a bending moment will occur in member 102 due to force difference $F_1-F_2$ about the base securing of said member, so the compressive force on one oscillating portion, for example, that under electrode 17 will decrease and the force of the oscillating portion under the other electrode 108 will increase thus having the advantage of an output difference frequency from the unit which is twice as great in magnitude as was the case with the transducers described in the earlier figures.

Figure 12:
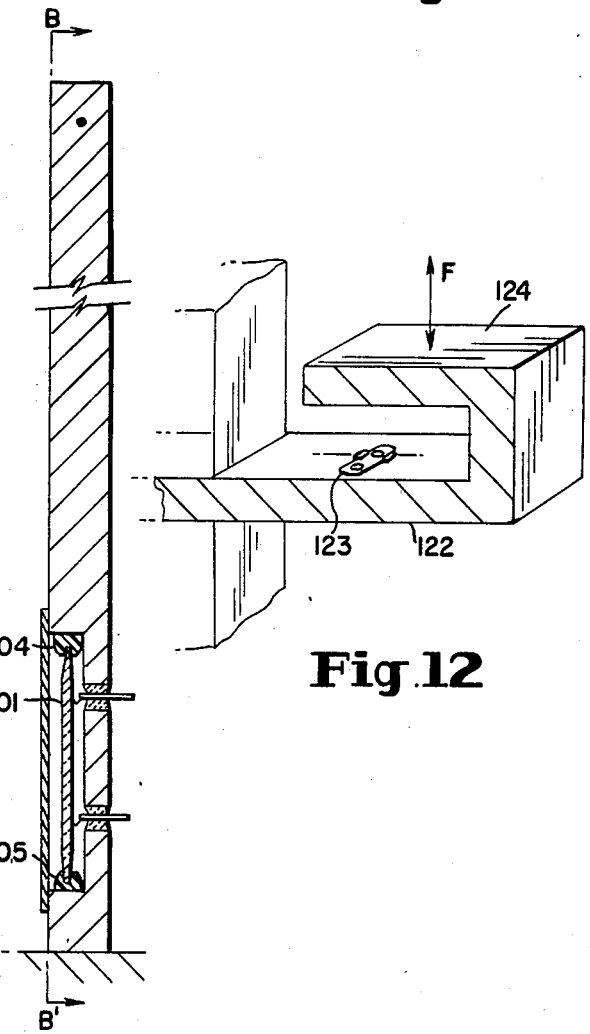
FIG. 12 shows a perspective view of a load cell incorporating the invention for application to weighing machines.

FIG. 12 shows a perspective sketch of a transducer employing the crystal design heretofore described but with the advantage of larger difference frequency charge.

A U-shaped homogeneous metal cantilever 122 has crystal 123 secured to one surface in the manner described with respect to FIG. 1. The upper section 124 of the cantilever is arranged to bear the load force F to be measured. Crystal 123 sustains tensional or compressional forces depending upon the direction of force F. Large difference frequencies result from this configuration because the surface strain in cantilever 122, where crystal 123 is secured, is significantly greater than the strain of a bar directly in tension or compression of the type shown in FIGS. 2 through 9 for a similar magnitude of change of force F.

The frequency change of crystal 123 may not be a precisely linear function of the change in force F. However, well known means comprising a micro-processor may be used to correct the non-linearity error.

Figure 13:
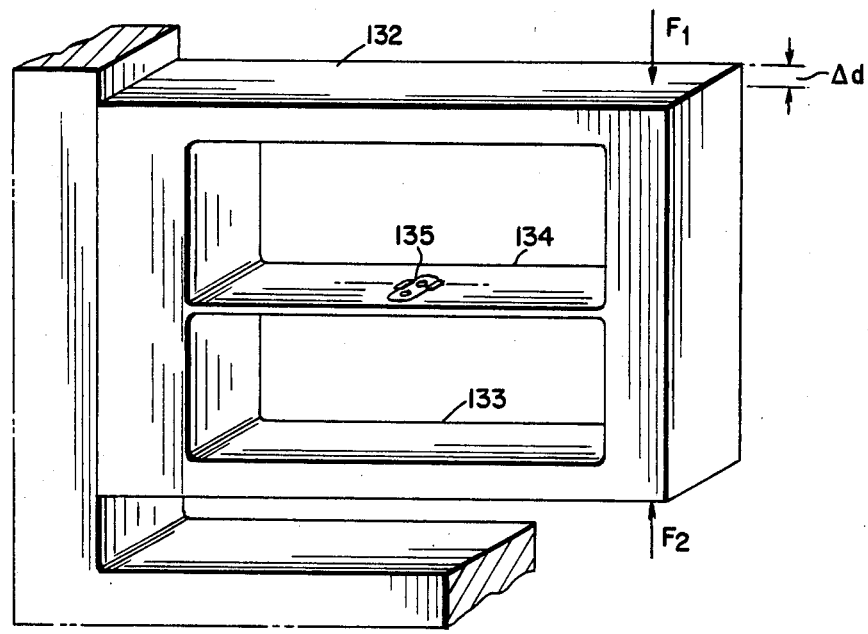
FIG. 13 shows a perspective view of an alternative load cell for weighing machines.

FIG. 13 shows a preferred sensor using the principles of the present invention to achieve linearity of frequency difference v.s. force function without the requirement for the correction procedure. A homogeneous cantilever system has two load bearing cantilevers 132 and 133 formed by machining a metal slab. Further machining provides a third thin flat sensing member 134. Force F applied at the outer ends of the cantilevers results in a longitudinal strain in member 134. Crystal 135 is secured to member 134 in the manner described with reference to FIGS. 2 through 9 and has the advantage of providing a very linear relationship between difference frequency change and change in the magnitude of Force F. This configuration is particularly applicable to use in weighing machines of the well-known type having a top pan. Such a top pan may be firmly secured to the end of the cantilevers at the application point of force F. The reason for this applicability is that the stiffness of the cantilever configuration of FIG. 13 permits measurement of the weight of objects placed at any location on the pan rather than requiring that the centers of gravity of said objects be directly in line with the line of application of force F.

Figure 14:
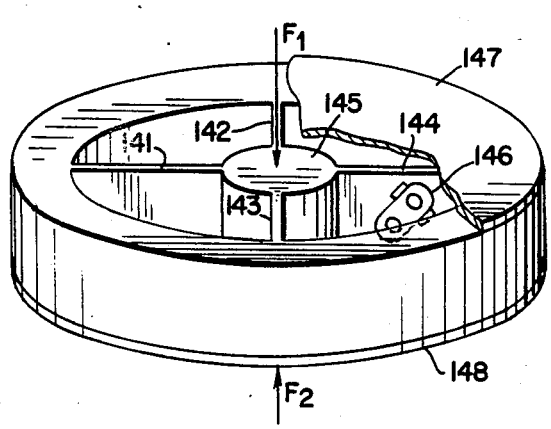
FIG. 14 shows a perspective view of a load cell which may be used alternatively as a pressure gage employing a concentric configuration.

A load cell configuration capable of sustaining large forces or fluid pressures is shown in FIG. 14. This has a wheel-shape with a number of spokes 141, 142, 143 and 144 machined from a single block of metal. One or more of these thin spoke-like members, for example member 144, has a crystal 146 bonded onto it in the manner of the bonding described with reference to FIGS. 2 and 3 although it will be appreciated the methods of FIGS. 4 through 9 could also be adapted to be employed. The hub 145 receives the force $F_1$ to be measured, either directly or from a diaphragm 147 on which a fluid pressure may be exerted. Change in stress in a spoke-like member, for example member 144, causes change in difference frequency between the two oscillating portions of the crystal as heretofore explained in detail with reference to all foregoing figures. The use of a second diaphragm 148 below the unit permits full hermetic sealing of said unit by welding outer rim 149 to diaphragms 147 and 148. This also permits the unit to be employed as a differential pressure gage, the fluid pressures being arranged to be applied to diaphragms 147 and 148.

The spokes 141 through 144 of the configuration of FIG. 14, are shown to flat in the axial direction of the unit. If however, they had been machined to have their thin dimension along the axial direction of the unit that is to say at right-angles the direction shown in FIG. 14 then the transducer, so formed, would have a larger difference frequency response v.s. change of force F. The fundamental similarity to the configuration of FIG. 12 will be evident.

Figure 15:
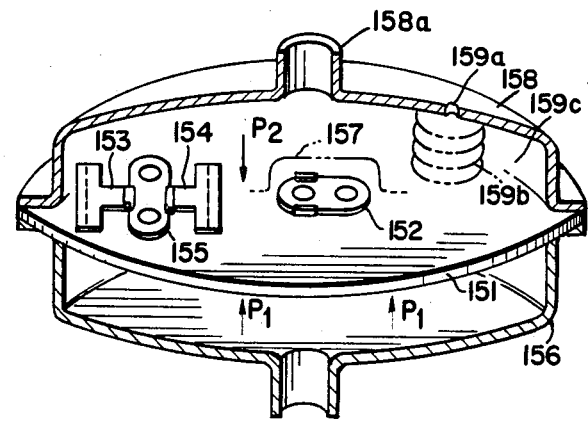
FIG. 15 shows a perspective view of a diaphragm employing crystals which are secured in the manner of the invention to enable fluid pressure to be measured.

In FIG. 15 a metal or other diaphragm 151 which may be plain or serrated in the well-known manner has a crystal 152 bonded to the center of its surface in the manner already described with reference to FIGS. 2 and 3. Fluid pressure $P_1$ applied to the underside of diaphragm 151, causes convex upward deformation of the diaphragm to apply a tensile stress to crystal 152. This results in a difference frequency change of crystal 152 as heretofore described. An alternative method of securing the crystal to obviate the effect of slight bending of it, when pressure $P_1$ changes, is to weld thin strip metal straps 153 and 154 to the diaphragm surface and bond crystal 155, which is shown, for example, in an alternative position, to the other ends of said metal strips. The small bending moments of the thin strips now permit the crystal to respond to changes of pressure $P_1$ by varying tensile force in the crystal in response to the convex deformation of diaphragm 151.

The diaphragm configuration of FIG. 15 may be completed by welding a housing 156 to hermetically seal crystals 152 or 155. Alternatively crystals 152 or 155 may be hermetically sealed by placing small thin metal caps over them, as shown for example diagramatically by the dashed line 157 to permit two differing fluid pressures $P_1$ and $P_2$ to be applied, one to each side of the diaphragm 151 to form a differential pressure gage which is completed by a further cover 158.

If for example pressure $P_2$ is to be atmospheric pressure then port 158a may be sealed off and the atmospheric pressure introduced via a small hole 159a in cover 158. To seal crystals 152 and 155 from corrosion a small flexible bellows 159b may be located on the inner side of hole 159a. Corrosion prevention can be further assisted by inert gas filling of cavity 159c.

All of the transducer configurations in the present disclosures have shown an elongated crystal with two oscillating portions. It will be appreciated that any of these configurations could have been arranged alternatively to employ two crystals side by side, each one having a single oscillating portion as described, for instance, in my U.S. Pat. No. 4,439,705.

Figure 16:
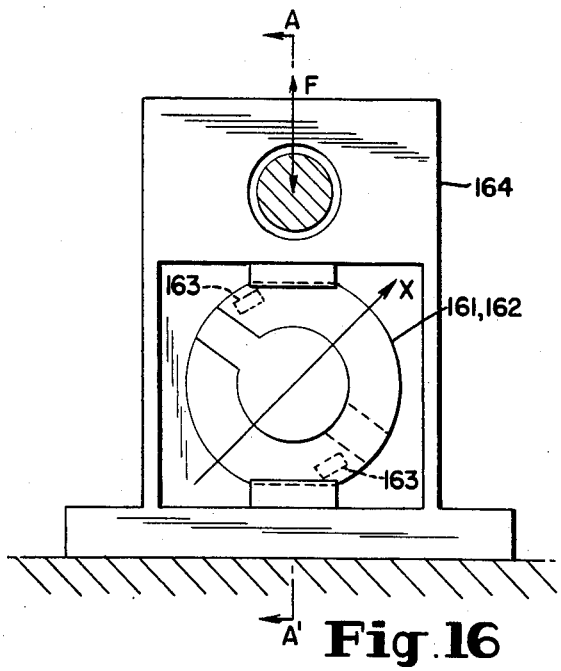
FIGS. 16 and 17 show a sectional side view and sectional elevation of a load cell employing a pair of crystals.
Figure 17:
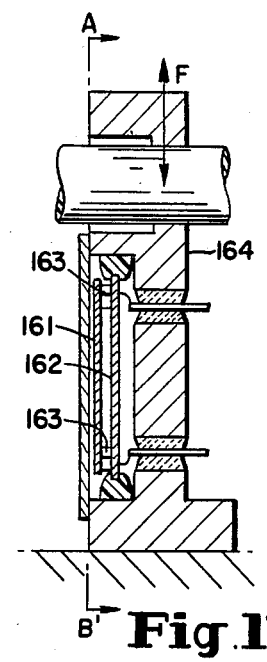

As an example FIGS. 16 and 17, which are analogous to FIGS. 2 and 3, show two crystals 161 and 162 secured together by cemented spacers 163 in the manner of said Patent and bonded to substantial member 164 as described herein with reference to FIGS. 2 and 3. Only one, 161, of the two crystals receives the force originating from strain in member 164 and thus changes frequency. The second crystal provides a reference frequency in an analogous manner to the monolithic crystals with two oscillating portions.

Figure 18:
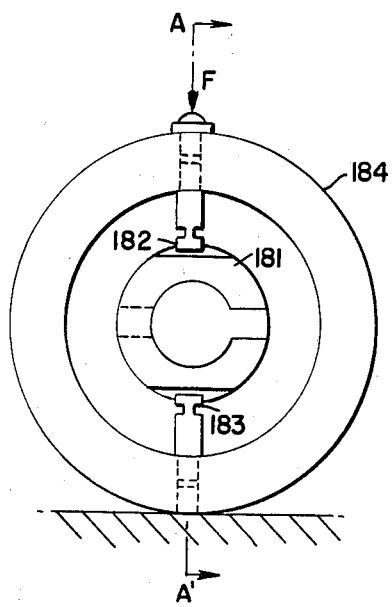
FIGS. 18 and 19 show a sectional view and a sectional elevation of a transducer employing a proof ring as its load bearing member and two crystals.
Figure 19:
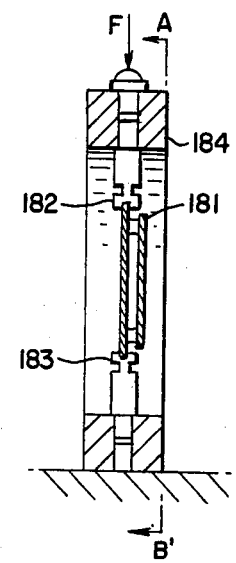

FIGS. 18 and 19 show a crystal pair 181 of the form described with respect to FIGS. 16 and 17. Crystal 181 is located between seatings 182 and 183 within a proof ring 184. Deformation of proof ring 184 by force F results in a force smaller than F being applied to one of the crystals of pair 181.

Figure 20:
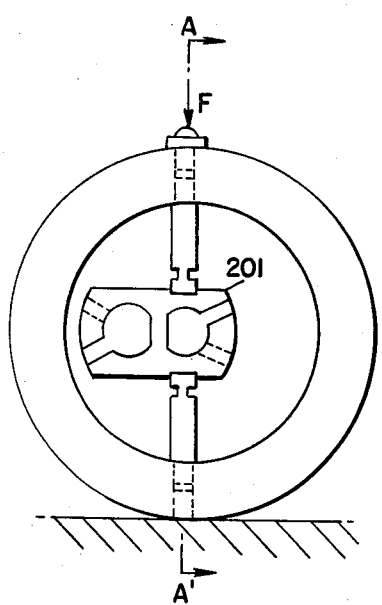
FIGS. 20 and 21 show a sectional side view and a sectional elevation of a transducer employing a proof ring as its load-bearing member and a single crystal.
Figure 21:
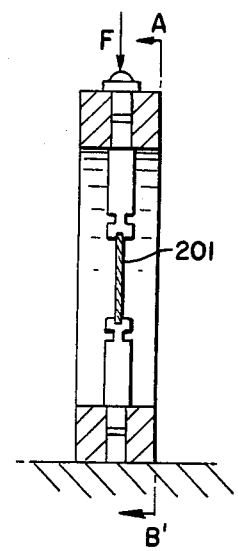

FIGS. 20 and 21 show a proof ring arrangement analogous to the transducers of FIGS. 18 and 19 but employing monolithic crystal 201 already described with respect to FIG. 2 herein. This has superior temperature and long term stability because the two frequencies track each other better over the course of time and temperature change.

The transducers described in the foregoing may be used as accelerometers when a mass is secured to the point of application of the force. Such a mass 42 is shown as an example, in FIGS. 4 and 5. A similar mass may be added to any of the configurations described heretofore to measure either steady linear acceleration, vibrational accelerations or those arising from shock.

In certain figures herein, for example FIGS. 2 and 3, the crystal is shown as having a bevel 31. The reason for this provision is to attenuate unwanted modes of oscillation by the well known energy trapping principle. A similar result is achieved by making the crystal convex on its faces.

Although an AT-cut quartz crystal oscillating in the thickness shear mode, as described in earlier patents referred to herein, is suitable for use in the foregoing configurations it has been found that other similar cuts of crystal well known as the BT- and SC-cuts amongst others, are also useful for particular applications such as, for example, other temperature ranges of operation of the instrument.

As explained in my U.S. Pat. Nos. 4,020,448 4,439,705 and 4,485,323 the two oscillating portions of the crystal or of the two separate crystals may be caused to oscillate alternately by a single oscillator circuit. Such an arrangement is shown diagramatically in FIG. 22. Amplifier 221 is arranged to feed back to electrode pair 222 or 223 alternately by electronic switch 224. The feedback loop 225 provides the 360 degrees of phase shift required to maintain oscillation of the electrode pairs when each is excited.

The alternate frequencies of the loop output are further amplified by amplifier 226 and fed to a digital integrated circuit divider 227 which operates the switch at a rate dependent upon the selected value of the divisor of divider 227. The alternate frequency output 228 of the circuit may be fed to a microprocessor for subtraction of the one frequency from the other or the output 229 of the divider may be employed to achieve a period count in the well known manner.

Further, instead of sensing the two frequencies alternately it may be advantageous in some applications to occaisionally sense and store one frequency and make several measurements of the other frequency before updating said one frequency.

Figure 22:
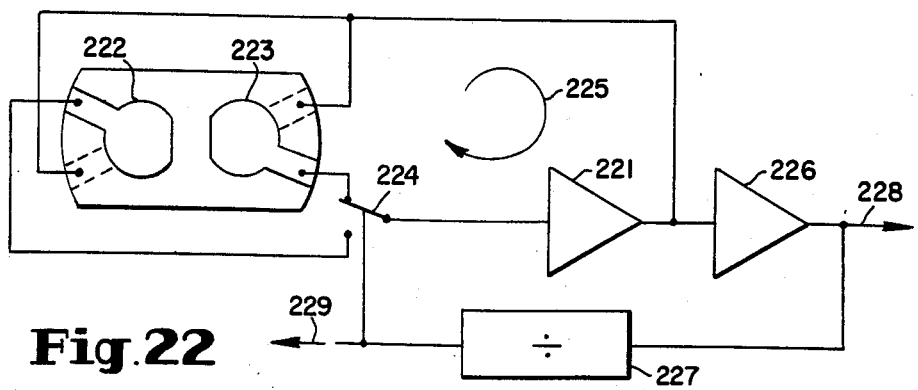
FIG. 22 shows diagramatically a circuit arranged to cause the two portions of the crystal to oscillate alternately.

The foregoing methods have a distinct advantage over the use of two separate feedback loops to maintain oscillation of the electrode pairs 222 & 223 in that, circuit components associated with each of the two loops cause relative temperature-dependent frequency shifts whereas such errors become common mode in the arrangement of FIG. 22.

ADVANTAGES OF THE NEW TECHNOLOGY DISCLOSED ABOVE OVER EARLIER TECHNOLOGY

1. The crystal is secured more firmly in position and hence is less readily dislodged by shock and vibration.
2. Much larger forces and pressures can be measured than hitherto.
3. Smaller, thinner crystals having very high sensitivities to force may be employed because such crystals are only required to sustain a small proportion of the force to be measured.
4. Such crystals can be lower in price than heretofore.
5. The crystal was formerly secured by a clamping force. Any long term instability of the clamping force could contribute to shift and hence inaccuracy of the instrument output. Such clamping force is unnecessary when using the new technology.

I claim:
1. A force transducer comprising:
   a plate-shaped piezo-electric crystal having a peripheral edge,
   a first pair of electrodes disposed on a corresponding region on opposite sides of a first portion of the crystal,
   a second pair of electrodes disposed on a corresponding region on opposite sides of a second portion of the crystal,
   means for energising the electrode pairs to maintain oscillation of the first and second crystal portion,
   a substantial member, other than the crystal, which sustains the majority of the force to be measured by the transducer,
   bonding of one or more pairs of opposing sections of the edge of the crystal, each opposing section of which is in the vicinity of a line through an electrode pair, to at least one portion of said substantial member such that the maximum force to be measured is not less than twice as great as the maximum force which could be sustained by the crystal alone without mechanical failure of the crystal.

2. A force transducer comprising two plate-shaped piezo-electric crystals each having a peripheral edge,
   one pair of electrodes per crystal disposed on corresponding regions on opposite sides of each crystal,
   means for energising the electrode pairs to maintain oscillation of the two crystal portions,
   a substantial member, other than the crystal, which sustains the majority of the force to be measured by the transducer,
   bonding of one or more pairs of opposing sections of the edges of the crystals, each opposing section of which is in the vicinity of a line through an electrode pair to at least one portion of said substantial member such that the maximum force to be measured is not less than twice as great as the maximum force which could be sustained by the crystal alone without mechanical failure of the crystal.

3. A force transducer according to claim 1 or 2 wherein means are provided for computing the difference frequency between the two regions and providing this difference frequency as the instrument output.

4. A force transducer according to claim 1 or 2 wherein a single oscillator circuit is arranged to excite each of the two oscillating portions of the crystal at different times.

5. A force transducer according to claim 1 or 2 wherein the axis of the bonding is arranged at an angle with respect to the principal axes of the crystal such that the frequency v.s. force sensitivity of the instrument output is independent of ambient temperature changes of the crystal.

6. A force transducer according to claims 1 or 2 wherein one or more of the bonded members sits on a knife edge.

7. A force transducer according to claim 1 or 2 wherein one or more bonded members is arranged to receive force at an adjustable point along its edge.

8. A force transducer according to claims 1 or 2 wherein the temperature coefficient of expansion of the bonding material is matched to that of the piezo-electric crystal and to that of the bonded member.

9. A force transducer according to claims 1 or 2 wherein the bonding material is ceramic or glass.

10. A force transducer according to claims 1 or 2 wherein one or more regions of the crystal is arranged to oscillate in an overtone mode.

11. A force transducer according to claims 1 or 2 wherein the crystal is bevelled at its edges.

12. A force transducer according to claim 1 or 2 wherein more than two pairs of electrodes are present on a corresponding region on opposite sides of the crystal.

13. A force transducer according to claims 1 or 2 wherein the space enclosing the crystal is hermetically sealed.

14. A force transducer according to claims 1 or 2 which is arranged to measure the difference between two forces.

15. A force transducer according to claims 1 or 2 wherein the force originates from a diaphragm or bellows which receives a fluid pressure, the amplitude of which is to be measured.

16. A force transducer according to claims 1 or 2 which is arranged to measure the difference between two fluid pressures.

17. A force transducer according to claims 1 or 2 which is arranged to measures the difference between two fluid pressures where one of the pressures is atmospheric pressure and is applied to the transducer via a bellows.

* * * * *